United States Patent
Nishikawa

(10) Patent No.: US 11,290,852 B2
(45) Date of Patent: Mar. 29, 2022

(54) POSITION ESTIMATION APPARATUS, POSITION ESTIMATION METHOD, PROGRAM, AND POSITION ESTIMATION SYSTEM

(71) Applicant: NEC CORPORATION, Tokyo (JP)

(72) Inventor: Yoshiaki Nishikawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/128,605

(22) Filed: Dec. 21, 2020

(65) Prior Publication Data
US 2021/0195377 A1 Jun. 24, 2021

(30) Foreign Application Priority Data
Dec. 24, 2019 (JP) .............................. JP2019-232260

(51) Int. Cl.
*H04W 4/029* (2018.01)

(52) U.S. Cl.
CPC .................... *H04W 4/029* (2018.02)

(58) Field of Classification Search
None
See application file for complete search history.

(56) References Cited

U.S. PATENT DOCUMENTS

2005/0243936 A1* 11/2005 Agrawala ............. H04W 64/00
375/259
2018/0146343 A1* 5/2018 Lee ......................... A63F 13/21

FOREIGN PATENT DOCUMENTS

JP 2017-67529 A 4/2017

\* cited by examiner

*Primary Examiner* — Ted M Wang
(74) *Attorney, Agent, or Firm* — Sughrue Mion, PLLC

(57) ABSTRACT

An estimation unit 32 estimates, from each of acquired first time-series data pieces, a state of a radio field intensity at a position of an apparatus 10 that corresponds to each of the first time-series data pieces. The estimation unit 32 estimates, from second time-series data, a state of the radio field intensity at a position of an apparatus 20. An estimation unit 33 estimates a state of the radio field intensity at each point in a target space by using the position of each apparatus 10 and the state of the radio field intensity thereof. An estimation unit 34 compares the state at each point with the state at the position of the apparatus 20 and thereby estimates the position of the apparatus 20. An estimation unit 35 estimates a position state of the apparatus 20 based on time-series data of the position of the apparatus 20.

9 Claims, 8 Drawing Sheets

POSITION ESTIMATION APPARATUS, POSITION ESTIMATION METHOD, PROGRAM, AND POSITION ESTIMATION SYSTEM

INCORPORATION BY REFERENCE

This application is based upon and claims the benefit of priority from Japanese patent application No. 2019-232260, filed on Dec. 24, 2019, the disclosure of which is incorporated herein in its entirety by reference.

TECHNICAL FIELD

The present disclosure relates to a position estimation apparatus, a position estimation method, a program, and a position estimation system.

BACKGROUND ART

A technique for estimating a position based on a received radio field intensity has been proposed (for example, Japanese Unexamined Patent Application Publication No. 2017-67529). In the technique disclosed in Japanese Unexamined Patent Application Publication No. 2017-67529, a position estimation apparatus holds a set value of an attenuation parameter for calculating reception power of a radio signal in each radio base station for each distance area of azimuth areas in the respective radio base stations. Further, the position estimation apparatus acquires a measurement value of the reception power from each radio base station. Then, the position estimation apparatus estimates the position of a mobile terminal by searching on a map for a position where an attenuation tendency of the reception power in each radio base station with respect to the transmission power of the radio signal, it being possible to calculate the attenuation tendency using the set value of the attenuation parameter set in each of the distance areas of the respective radio base stations, conforms to an attenuation tendency indicated by the measurement value of the reception power acquired from each of the radio base stations.

The inventor of the present disclosure has found that the technique disclosed in Japanese Unexamined Patent Application Publication No. 2017-67529 may have a low accuracy in position estimation. That is, noises are superimposed for various reasons on the radio field intensities observed constantly by observation apparatuses, and the observation values change stochastically. In such a stochastic variation, values observed by the observation apparatuses are different from each other. Therefore, noise also appears in the radio field intensity of the space calculated based on the observation values. Noise also appears in an estimated position calculated based on the above radio field intensity of the space where noise appears. As a result, the accuracy of position estimation may become low.

SUMMARY

An object of the present disclosure is to provide a position estimation apparatus, a position estimation method, a program, and a position estimation system that are capable of improving the accuracy of position estimation.

A position estimation apparatus according to a first aspect includes:

an acquisition unit configured to acquire, from each of a plurality of first observation apparatuses of which positions are known, first time-series data of a radio field intensity of a predetermined signal received by each of the plurality of the first observation apparatuses and acquire, from a second observation apparatus of which a position is not known, second time-series data of a radio field intensity of a predetermined signal received by the second observation apparatus;

a radio field intensity state estimation unit configured to estimate, from each of the acquired first time-series data pieces, a state of a radio field intensity at a position of the first observation apparatus that corresponds to each of the first time-series data pieces, and estimate, from the acquired second time-series data, a state of a radio field intensity at a position of the second observation apparatus;

a radio field intensity space estimation unit configured to estimate a state of a radio field intensity at each of points in a target space by using the position and the estimated state of the radio field intensity of each of the plurality of the first observation apparatuses;

a position estimation unit configured to compare the estimated state of the radio field intensity at each of the points with the estimated state of the radio field intensity at the position of the second observation apparatus and thereby estimate the position of the second observation apparatus; and a position state estimation unit configured to estimate a position state of the second observation apparatus based on third time-series data of the estimated position of the second observation apparatus.

A position estimation method according to a second aspect includes:

acquiring, from each of a plurality of first observation apparatuses of which positions are known, first time-series data of a radio field intensity of a predetermined signal received by each of the plurality of the first observation apparatuses and acquiring, from a second observation apparatus of which a position is not known, second time-series data of a radio field intensity of a predetermined signal received by the second observation apparatus;

estimating, from each of the acquired first time-series data pieces, a state of a radio field intensity at a position of the first observation apparatus that corresponds to each of the first time-series data pieces, and estimating, from the acquired second time-series data, a state of a radio field intensity at a position of the second observation apparatus;

estimating a state of a radio field intensity at each of points in a target space by using the position and the estimated state of the radio field intensity of each of the plurality of the first observation apparatuses;

comparing the estimated state of the radio field intensity at each of the points with the estimated state of the radio field intensity at the position of the second observation apparatus and thereby estimating the position of the second observation apparatus; and estimating a position state of the second observation apparatus based on third time-series data of the estimated position of the second observation apparatus.

A program according to a third aspect causes a position estimation apparatus to:

acquire, from each of a plurality of first observation apparatuses of which positions are known, first time-series data of a radio field intensity of a predetermined signal received by each of the plurality of the first observation apparatuses and acquire, from a second observation apparatus of which a position is not known, second time-series data of a radio field intensity of a predetermined signal received by the second observation apparatus;

estimate, from each of the acquired first time-series data pieces, a state of a radio field intensity at a position of the first observation apparatus that corresponds to each of the first time-series data pieces, and estimate, from the acquired second time-series data, a state of a radio field intensity at a position of the second observation apparatus;

estimate a state of a radio field intensity at each of points in a target space by using the position and the estimated state of the radio field intensity of each of the plurality of the first observation apparatuses;

compare the estimated state of the radio field intensity at each of the points with the estimated state of the radio field intensity at the position of the second observation apparatus and thereby estimate the position of the second observation apparatus; and estimate a position state of the second observation apparatus based on third time-series data of the estimated position of the second observation apparatus.

A position estimation system according to a fourth aspect includes:

a plurality of first observation apparatuses of which positions are known;

a second observation apparatus of which a position is known; and a position estimation apparatus, in which the position estimation apparatus includes:

an acquisition unit configured to acquire, from each of the plurality of the first observation apparatuses, first time-series data of a radio field intensity of a predetermined signal received by each of the plurality of the first observation apparatuses and acquire, from the second observation apparatus, second time-series data of a radio field intensity of a predetermined signal received by the second observation apparatus;

a radio field intensity state estimation unit configured to estimate, from each of the acquired first time-series data pieces, a state of a radio field intensity at a position of the first observation apparatus that corresponds to each of the first time-series data pieces, and estimate, from the acquired second time-series data, a state of a radio field intensity at a position of the second observation apparatus;

a radio field intensity space estimation unit configured to estimate a state of a radio field intensity at each of points in a target space by using the position and the estimated state of the radio field intensity of each of the plurality of the first observation apparatuses;

a position estimation unit configured to compare the estimated state of the radio field intensity at each of the points with the estimated state of the radio field intensity at the position of the second observation apparatus and thereby estimate the position of the second observation apparatus; and a position state estimation unit configured to estimate a position state of the second observation apparatus based on third time-series data of the estimated position of the second observation apparatus.

BRIEF DESCRIPTION OF DRAWINGS

The above and other aspects, features and advantages of the present disclosure will become more apparent from the following description of certain example embodiments when taken in conjunction with the accompanying drawings, in which.

EXAMPLE EMBODIMENTS

Example embodiments will be described hereinafter with reference to the drawings. Note that the same or equivalent components will be denoted by the same reference symbols throughout the example embodiments, and redundant descriptions will be omitted.

First Example Embodiment

<Overview of Position Estimation System>

Figure 1:
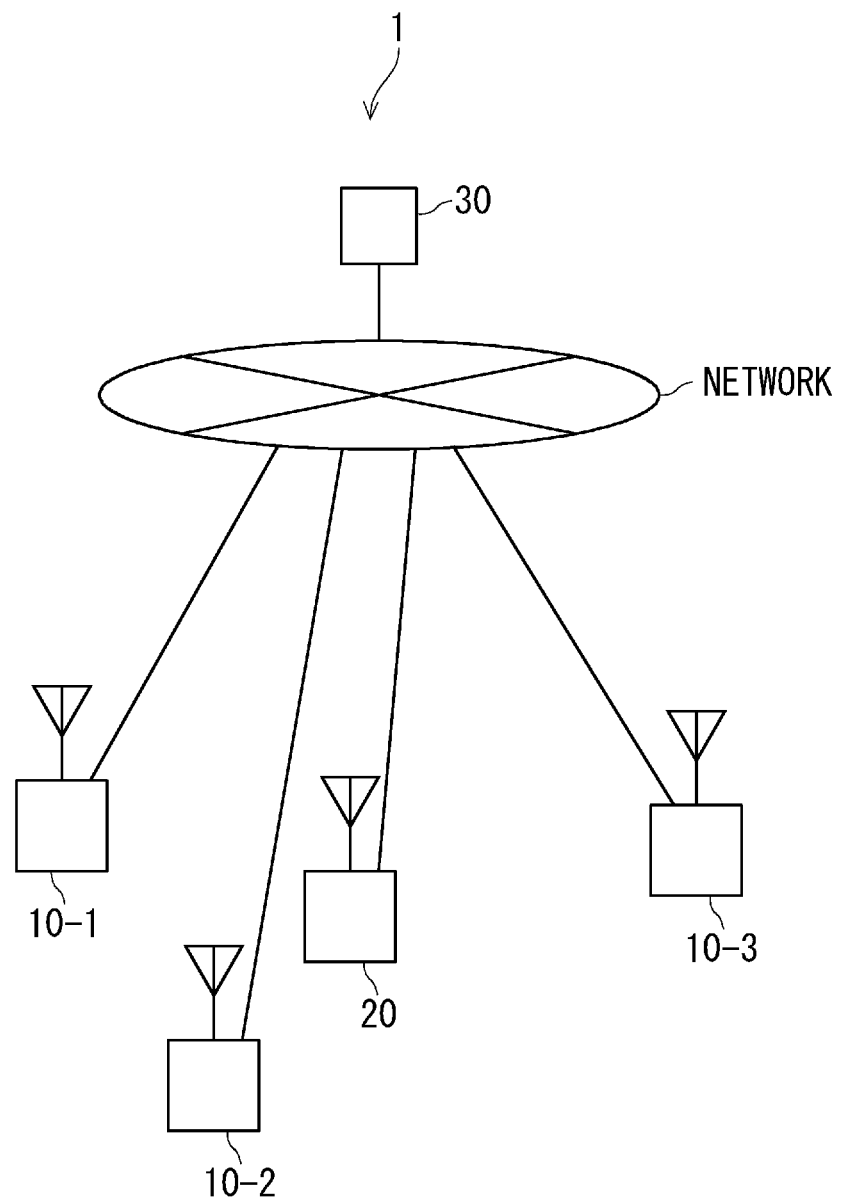
FIG. 1 is a diagram showing an example of a position estimation system according to a first example embodiment.

FIG. 1 is a diagram showing an example of a position estimation system according to a first example embodiment. In FIG. 1, a position estimation system 1 includes an observation apparatus (a first observation apparatus) 10-1, an observation apparatus (a first observation apparatus) 10-2, and an observation apparatus (a first observation apparatus) 10-3, an observation apparatus (a second observation apparatus) 20, and a position estimation apparatus (an analysis apparatus) 30. In the following description, when the observation apparatuses 10-1 to 10-3 are not distinguished from each other, each of the observation apparatuses 10-1 to 10-3 may be simply referred to as the observation apparatus 10. Note that in this example, in order to make the explanations simple, the number of observation apparatuses 10 and 20 included in the position estimation system 1 is 3 and 1, respectively, but the present disclosure is not limited thereto.

Each of the observation apparatuses 10 is an observation apparatus of which the position is known. On the other hand, the observation apparatus 20 is an observation apparatus of which the position is not known. That is, the position estimation system 1 is a system that estimates a position of the observation apparatus 20.

Each of the observation apparatuses 10 receives a plurality of "predetermined signals" sequentially transmitted by radio from a signal transmission source (not shown), and measures a "radio field intensity" of each of the received predetermined signals. In this way, time-series data (hereinafter it may be referred to as "first time-series data") of the radio field intensity is obtained. That is, the first time-series data includes a plurality of radio field intensities (i.e., a "first radio field intensity group"), which correspond to the respective received predetermined signals. Then, each of the observation apparatuses 10 transmits the first time-series data to the position estimation apparatus 30.

The observation apparatus 20 receives a plurality of "predetermined signals" sequentially transmitted by radio from the signal transmission source (not shown), and measures a radio field intensity of each of the received predetermined signals. In this way, time-series data (hereinafter it may be referred to as "second time-series data") of the radio field intensity is obtained. That is, the second time-series data includes a plurality of radio field intensities (i.e., a "second radio field intensity group"), which correspond to the respective received predetermined signals. Then, the observation apparatus 20 transmits the second time-series data to the position estimation apparatus 30. Note that the observation apparatus 10 and the position estimation apparatus 30, and the observation apparatus 20 and the position estimation apparatus 30 may be connected wirelessly or by wire. FIG. 1 shows an example in which the observation apparatuses 10 are connected to the position estimation apparatus 30 by wire via a network, and the observation apparatus 20 is connected to the position estimation apparatus 30 by wire via a network.

The position estimation apparatus 30 acquires the first time-series data from each of the observation apparatuses 10 and acquires the second time-series data from the observation apparatus 20. Then, the position estimation apparatus 30 estimates a position of the observation apparatus 20 based on the acquired first time-series data pieces and the second time-series data.

<Configuration Example of Observation Apparatus>

Figure 2:
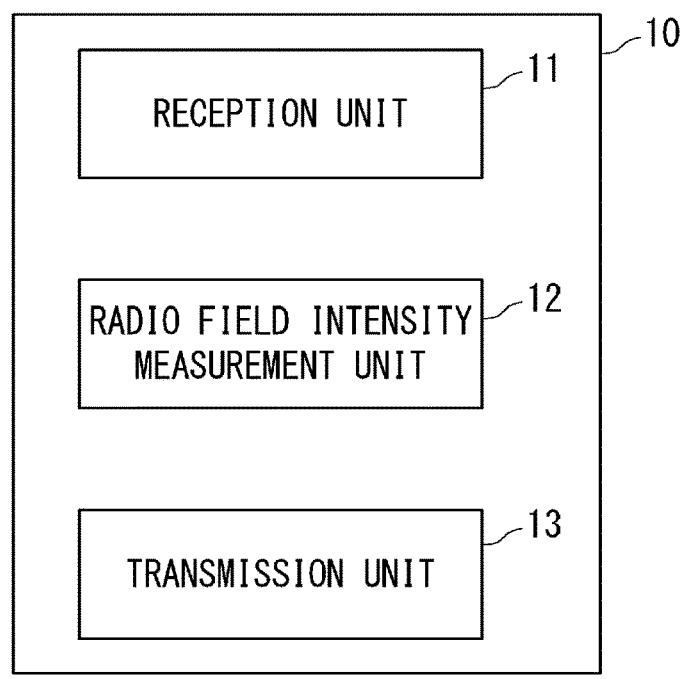
FIG. 2 is a block diagram showing an example of an observation apparatus according to the first example embodiment.
Figure 3:
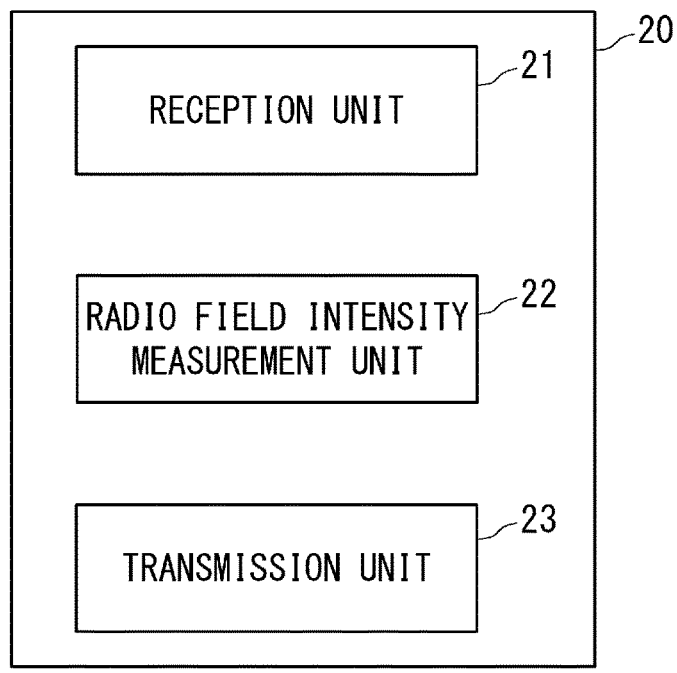
FIG. 3 is a block diagram showing an example of the observation apparatus according to the first example embodiment.

FIGS. 2 and 3 are block diagrams showing an example of the observation apparatus according to the first example embodiment. In FIG. 2, the observation apparatus 10 includes a reception unit 11, a radio field intensity measurement unit 12, and a transmission unit 13.

The reception unit 11 receives a plurality of "predetermined signals" sequentially transmitted by radio from the signal transmission source (not shown).

The radio field intensity measurement unit 12 measures (observes) a "radio field intensity" of each of the predetermined signals received by the reception unit 11. In this way, the aforementioned "first time-series data" is obtained.

The transmission unit 13 transmits the "first time-series data" obtained by the radio field intensity measurement unit 12 to the position estimation apparatus 30.

In FIG. 3, the observation apparatus 20 includes a reception unit 21, a radio field intensity measurement unit 22, and a transmission unit 23.

The reception unit 21 receives a plurality of "predetermined signals" sequentially transmitted by radio from the signal transmission source (not shown).

The radio field intensity measurement unit 22 measures (observes) a "radio field intensity" of each of the predetermined signals received by the reception unit 21. In this way, the aforementioned "second time-series data" is obtained.

The transmission unit 23 transmits the "second time-series data" obtained by the radio field intensity measurement unit 22 to the position estimation apparatus 30.

In general, the "radio field intensity" is determined in accordance with transmission power, reception sensitivity, and a communication environment between transmission and reception. The communication environment between transmission and reception includes distance, multipath, shielding, and fading. It is considered that the upper limit of an observation value of the radio field intensity is determined based on these information pieces, and in general, the upper limit decreases as the distance between transmission and reception increases. Meanwhile, in general, the lower limit of an observation value of the radio field intensity depends on a performance limit of the observation apparatus. The observation value of the radio field intensity appears stochastically between these upper and lower limits. That is, when there are a plurality of observation apparatuses, an observation apparatus that observes near the upper limit and an observation apparatus that observes near the lower limit within the distribution range of the radio field intensity of each observation apparatus may be present at the same time. In other words, when an observation apparatus located closer to the transmission source than another observation apparatus is has observed the radio field intensity near the lower limit and the other observation apparatus located farther from the transmission source than the former observation apparatus is has observed the radio field intensity near the upper limit, it may be observed that the radio field intensity, which is generally assumed to be attenuated in accordance with the distance, increases. As described above, noise is superimposed on the observation value of the radio field intensity.

<Configuration Example of Position Estimation Apparatus>

Figure 4:
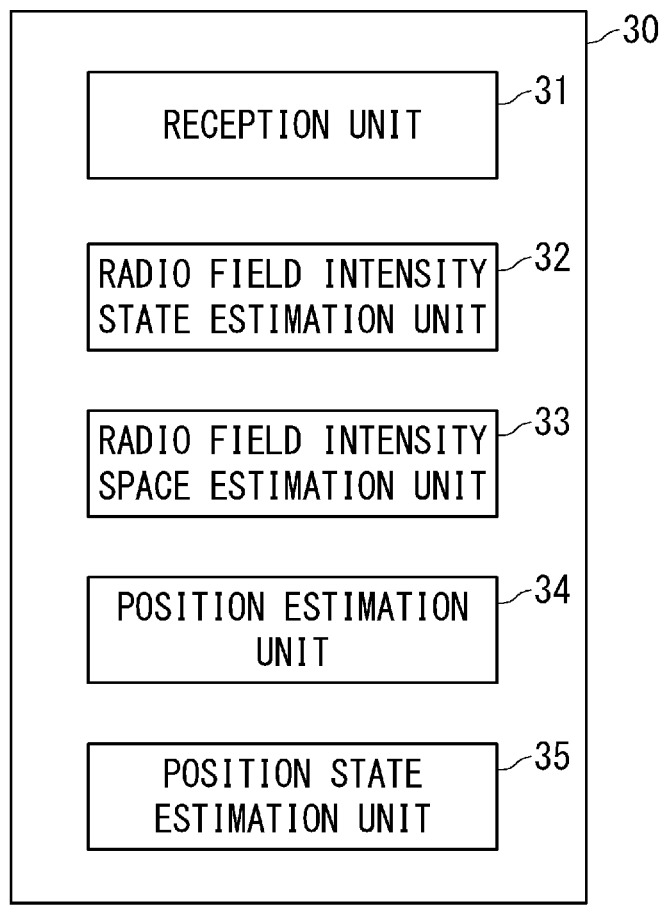
FIG. 4 is a diagram showing an example of a position estimation apparatus according to the first example embodiment.

FIG. 4 is a diagram showing an example of the position estimation apparatus according to the first example embodiment. In FIG. 4, the position estimation apparatus 30 includes a reception unit (an acquisition unit) 31, a radio field intensity state estimation unit 32, a radio field intensity space estimation unit 33, a position estimation unit 34, and a position state estimation unit 35.

The reception unit 31 receives (acquires) "first time-series data" from each of the observation apparatuses 10, and receives (acquires) "second time-series data" from the observation apparatus 20.

The radio field intensity state estimation unit 32 estimates, from each of the first time-series data pieces acquired by the reception unit 31, a "state of the radio field intensity" at the position of the observation apparatus 10 that corresponds to each of the first time-series data pieces. Further, the radio field intensity state estimation unit 32 estimates, from the second time-series data acquired by the reception unit 31, a "state of the radio field intensity" at the position of the observation apparatus 20. Note that as described above, the first time-series data is a time-series "first radio field intensity group", so that a time-series radio field intensity state group (hereinafter it may be referred to as a "first radio field intensity state group") is obtained from the first time-series data. Further, the second time-series data is a time-series "second radio field intensity group", so that a time-series radio field intensity state group (hereinafter it may be referred to as a "second radio field intensity state group") is obtained from the second time-series data. Here, "estimating a state" means to estimate a state (i.e., a true state) that cannot be observed (measured) from an observation value (a measurement value). In this specification, "estimating a state of the radio field intensity" means to estimate a "true radio field intensity (i.e., a state of the radio field intensity)" in the absence of noise from the values of the radio field intensities observed by the observation apparatuses 10 and 20.

The radio field intensity space estimation unit 33 estimates a state of the radio field intensity at each point in a target space (a target area) by using the position of each of the observation apparatuses 10-1 to 10-3 and the "state of the radio field intensity" estimated for each of the observation apparatuses 10-1 to 10-3. For example, the radio field intensity space estimation unit 33 may form a list (i.e., a "radio field intensity state map") of the states of the radio field intensities at the respective points in the target space (the target area). Here, as described above, the radio field intensity state estimation unit 32 obtains the "first radio field intensity state group", so that the radio field intensity space estimation unit 33 obtains a time-series radio field intensity state group (hereinafter it may be referred to as a "third radio field intensity state group") at each point in the target space (the target area). Note that information about the position of each of the observation apparatuses 10-1 to 10-3 may be stored in the radio field intensity space estimation unit 33 or in a storage unit (not shown).

The position estimation unit 34 compares the state of the radio field intensity at each point estimated by the radio field intensity space estimation unit 33 with the state of the radio field intensity at the position of the observation apparatus 20 estimated by the radio field intensity state estimation unit 32 and thereby estimates the position of the observation apparatus 20. For this estimation of the position, a method called a "Fingerprint Method" may be used. That is, the position estimation unit 34 may specify a point of the radio field intensity state map corresponding to the state of the radio field intensity close to the state of the radio field intensity at the position of the observation apparatus 20 estimated by the radio field intensity state estimation unit 32. For example, when the radio field intensities observed by the observation apparatuses 10 and 20 are expressed by vectors including elements according to the signal transmission source (not shown), the state of the radio field intensity at each point in the target space is also expressed by the vector. At this time, the position estimation unit 34 may specify, by using a vector including the state of the radio field intensity at the position of the observation apparatus 20 estimated by the radio field intensity state estimation unit 32 and the elements according to the signal transmission source (not shown) and a vector corresponding to each point in the radio field intensity state map, a point at which the sum of squares of the differences between the elements is minimized.

Here, the radio field intensity space estimation unit 33 obtains the "third radio field intensity state group" at each point in the target space, and the radio field intensity state estimation unit 32 obtains the "second radio field intensity state group". Thus, for example, the position estimation unit 34 compares the "third radio field intensity state group" at each point in the target space with the "second radio field intensity state group" and thereby estimates the position of the observation apparatus 20 corresponding to each radio field intensity included in the "second radio field intensity state group". In this way, an estimated time-series "position group" (hereinafter it may be referred to as "third time-series data") of the observation apparatus 20 is obtained.

The position state estimation unit 35 estimates a "position state" of the observation apparatus 20 based on the "third time-series data" of the position of the observation apparatus 20. In this specification, "estimating a position state" means to estimate a "true position (i.e., a position state)" in the absence of noise from the position estimated by the position estimation unit 34.

<Operation Example of Position Estimation Apparatus>
<Process for Estimating State of Radio Field Intensity>

Figure 5:
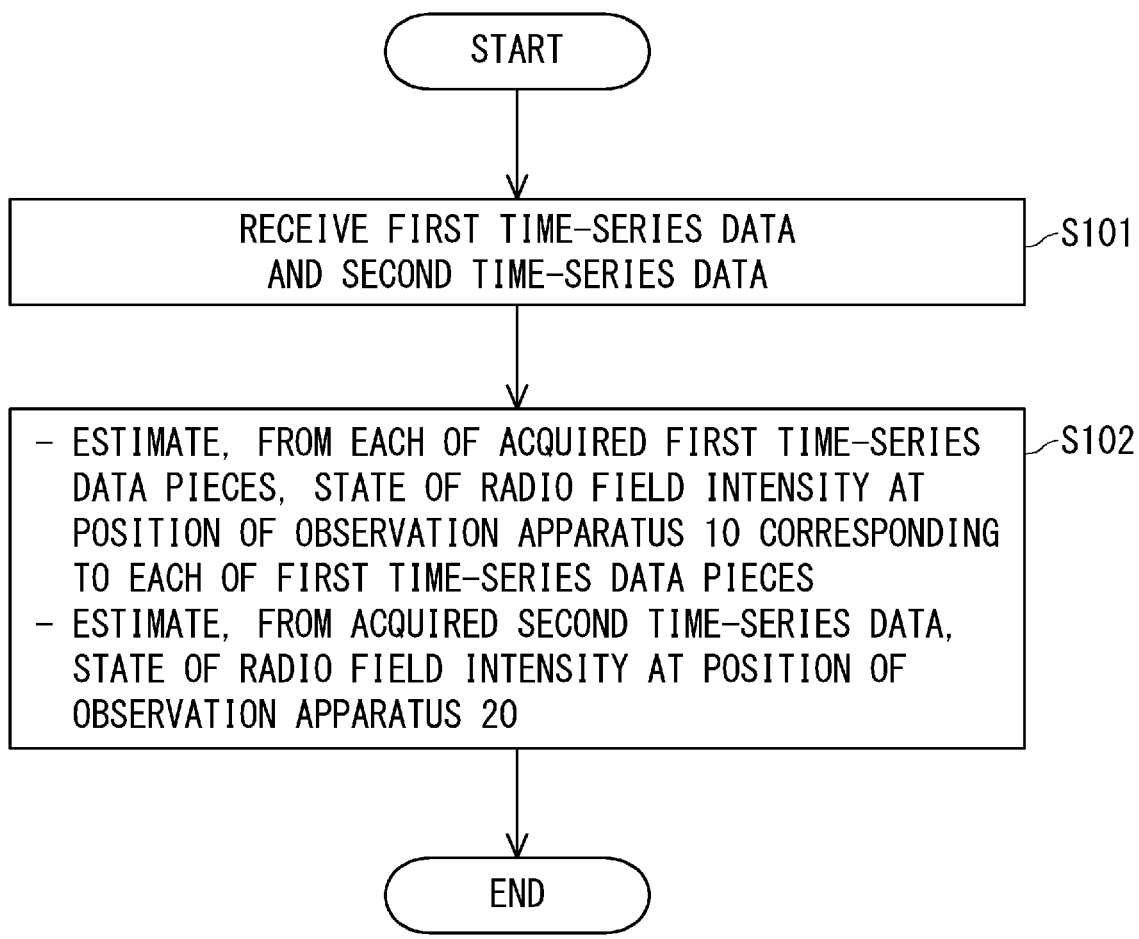
FIG. 5 is a flowchart showing an example of a process for estimating a state of a radio field intensity performed by the position estimation apparatus according to the first example embodiment.

FIG. 5 is a flowchart showing an example of a process for estimating a state of a radio field intensity performed by the position estimation apparatus according to the first example embodiment.

The reception unit 31 receives (acquires) "first time-series data" from each of the observation apparatuses 10, and receives (acquires) "second time-series data" from the observation apparatus 20 (Step S101).

The radio field intensity state estimation unit 32 estimates, from each of the first time-series data pieces acquired by the reception unit 31, a "state of the radio field intensity" at the position of the observation apparatus 10 that corresponds to each of the first time-series data pieces (Step S102). Further, the radio field intensity state estimation unit 32 estimates, from the second time-series data acquired by the reception unit 31, a "state of the radio field intensity" at the position of the observation apparatus 20 (Step S102).

<Process for Estimating State of Radio Field Intensity at Each Point of Target Space>

Figure 6:
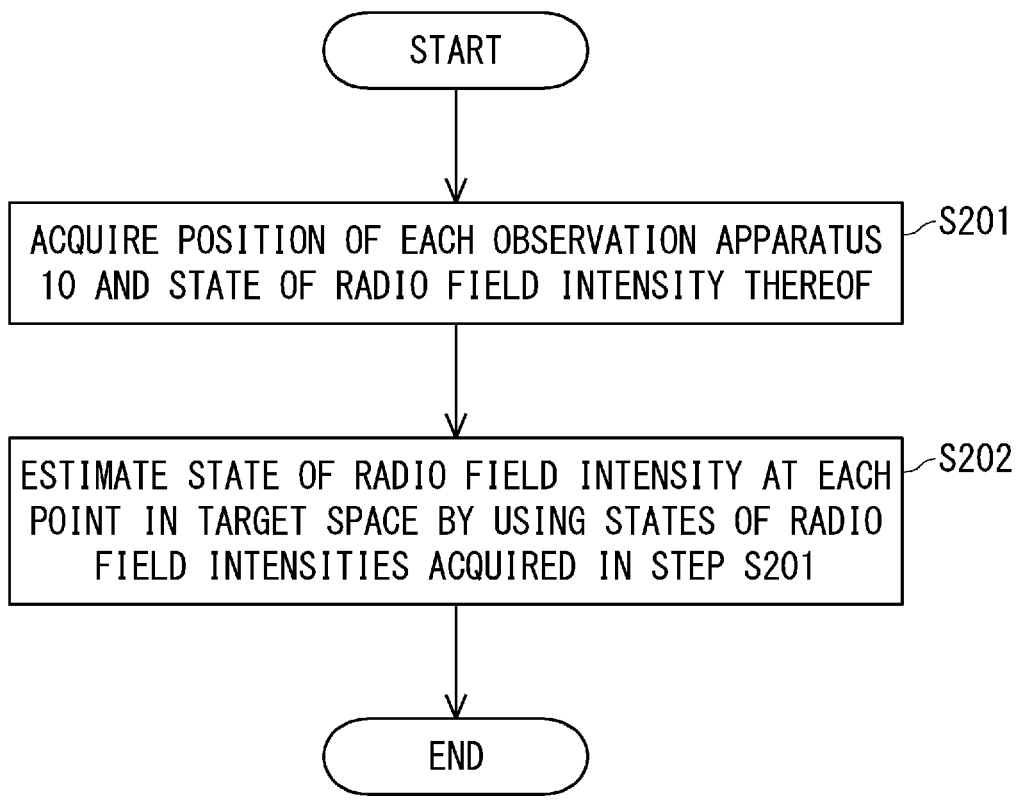
FIG. 6 is a flowchart showing an example of a process for estimating a state of a radio field intensity at each point in a target space performed by the position estimation apparatus according to the first example embodiment.

FIG. 6 is a flowchart showing an example of a process for estimating a state of a radio field intensity at each point in the target space performed by the position estimation apparatus according to the first example embodiment.

The radio field intensity space estimation unit 33 acquires the position and the "state of the radio field intensity" of each of the observation apparatuses 10-1 to 10-3 (Step S201).

The radio field intensity space estimation unit 33 estimates a state of the radio field intensity at each point in the target space by using the "states of the radio field intensities" acquired in Step S201 (Step S202).

<Process for Estimating Position State>

Figure 7:
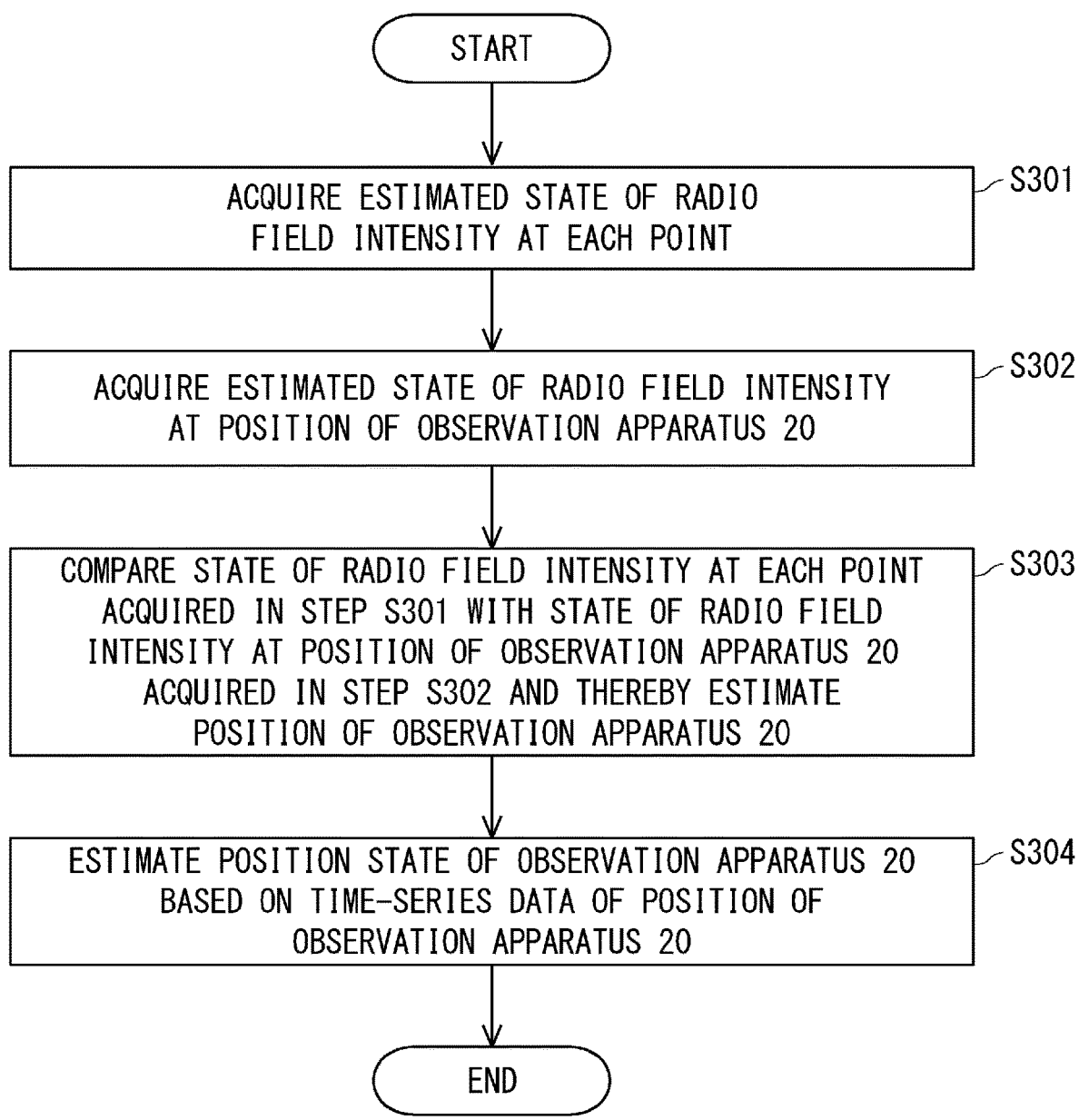
FIG. 7 is a flowchart showing an example of a process for estimating a position state performed by the position estimation apparatus according to the first example embodiment.

FIG. 7 is a flowchart showing an example of a process for estimating a position state performed by the position estimation apparatus according to the first example embodiment.

The position estimation unit 34 acquires the state of the radio field intensity at each point estimated by the radio field intensity space estimation unit 33 (Step S301).

The position estimation unit 34 acquires the state of the radio field intensity at the position of the observation apparatus 20 estimated by the radio field intensity state estimation unit 32 (Step S302).

The position estimation unit 34 compares the state of radio field intensity at each point acquired in Step S301 with the state of the radio field intensity at the position of the observation apparatus 20 acquired in Step S302 and thereby estimates the position of the observation apparatus 20 (Step S303).

The position state estimation unit 35 estimates a "position state" of the observation apparatus 20 based on the time-series data of the position of the observation apparatus 20 (Step S304).

Note that in the process flows shown in FIGS. 5 to 7, the processes may be performed asynchronously, independently of each other or performed as a series of processes.

As described above, according to the first example embodiment, the radio field intensity state estimation unit 32 of the position estimation apparatus 30 estimates, from each of the first time-series data pieces acquired by the reception unit 31, a "state of the radio field intensity" at the position of the observation apparatus 10 that corresponds to each of the first time-series data pieces. Further, the radio field intensity state estimation unit 32 estimates, from the second time-series data acquired by the reception unit 31, a "state of the radio field intensity" at the position of the observation apparatus 20. The radio field intensity space estimation unit 33 estimates a state of the radio field intensity at each point in the target space (the target area) by using the position of each of the observation apparatuses 10-1 to 10-3 and the "state of the radio field intensity" estimated for each of the observation apparatuses 10-1 to 10-3. The position estimation unit 34 compares the state of the radio field intensity at each point estimated by the radio field intensity space estimation unit 33 with the state of the radio field intensity at the position of the observation apparatus 20 estimated by the radio field intensity state estimation unit 32 and thereby estimates the position of the observation apparatus 20. The position state estimation unit 35 estimates a "position state" of the observation apparatus 20 based on the "third time-series data" of the position of the observation apparatus 20.

This configuration of the position estimation apparatus 30 reduces the effect of noise included in the observation value by performing a "two-step state estimation" of an "estimation of the state of the radio field intensity" and an "estimation of the position state", whereby it is possible to improve the accuracy of position estimation.

Second Example Embodiment

A second example embodiment relates to a more specific example embodiment. Note that the basic configurations of a position estimation system, an observation apparatus, and a position estimation apparatus according to the second example embodiment, respectively, are the same as those of the position estimation system 1, the observation apparatuses 10 and 20, and the position estimation apparatus 30 according to the first example embodiment, and thus will be described with reference to FIGS. 1 to 4.

In the second example embodiment, a local level model is applied as a "state transition model" to both the radio field intensity state estimation unit 32 and the position state estimation unit 35 of the position estimation apparatus 30.

First, a radio field intensity measured at time t by an observation apparatus s which is any of the observation apparatuses 10-1 to 10-3 is expressed by the following Expression 1.

$x_t^s$ (or $x_{s,t}$)      [Expression 1]

Further, a radio field intensity measured at time t by the observation apparatus 20 (hereinafter it may be referred to as observation apparatus u) is expressed by the following Expression 2.

$x_t^u$ (or $x_{u,t}$)      [Expression 2]

Each of $x_{s,t}$ and $x_{u,t}$ is, for example, a vector having, as an element, a radio field intensity for each type of radio wave, such as a transmission source and a frequency.

The reception unit 31 of the position estimation apparatus 30 according to the second example embodiment receives the radio field intensities $x_{s,t}$ and $x_{u,t}$.

The radio field intensity state estimation unit 32 estimates a "state of the radio field intensity" at the position of the observation apparatus s from the radio field intensity $x_{s,t}$ acquired by the reception unit 31. Further, the radio field intensity state estimation unit 32 estimates a "state of the radio field intensity" at the position of the observation apparatus u from the radio field intensity $x_{u,t}$ acquired by the reception unit 31.

In the following description, a state of the radio field intensity estimated from the radio field intensity $x_{s,t}$ is expressed by the following Expression 3.

$x'^s_t$ (or $x'_{s,t}$)      [Expression 3]

Further, a state of the radio field intensity estimated from the radio field intensity $x_{u,t}$ is expressed by the following Expression 4.

$x'^s_u$ (or $x'_{u,t}$)      [Expression 4]

The radio field intensity state estimation unit 32 uses the following state equation and observation equation when a state $x'_{s,t}$ of the radio field intensity is estimated from the radio field intensity $x_{s,t}$. Further, the radio field intensity state estimation unit 32 also uses the state equation and the observation equation similar to those mentioned above when a state $x'_{u,t}$ of the radio field intensity is estimated from the radio field intensity $x_{u,t}$.

State equation: $x'^s_{t+1} = x'^s_t + n_p$

Observation equation: $x^s_t = x'^s_t + n_m$      [Expression 5]

where $n_p$ and $n_m$ are Gaussian noises around zero.

That is, as described above, the local level model is applied to the radio field intensity state estimation unit 32 as the state transition model.

When the radio field intensity space estimation unit 33 receives the states $x'_{s,t}$ of the radio field intensities for the observation apparatuses s (the observation apparatuses 10-1 to 10-3), the radio field intensity space estimation unit 33 estimates a state of the radio field intensity at each point in the target space (the target area) by using the position of each of the observation apparatuses s (the observation apparatuses 10-1 to 10-3) and the state $x'_{s,t}$ of the radio field intensity thereof.

In the following description, a radio field intensity state vector at time t at any point p is expressed by the following Expression 6.

$\tilde{x}'^p_t$ (or $x_{p,t}$)      [Expression 6]

The position estimation unit 34 compares the state $x_{p,t}$ of the radio field intensity at each point estimated by the radio field intensity space estimation unit 33 with the state $x'_{u,t}$ of the radio field intensity at the position of the observation apparatus u estimated by the radio field intensity state estimation unit 32 and thereby specifies a point 1 corresponding to a specific radio wave intensity state vector $x_{l,t}$. For example, the position estimation unit 34 specifies a point 1 at which the sum of squares of the differences between the respective elements of the radio wave intensity state vectors $x'_{u,t}$ of the observation apparatus u and the respective elements of the radio wave intensity state vectors $x_{p,t}$ is minimized. The specified point 1 is an estimated position of the observation apparatus u. In the following description, the estimated position of the observation apparatus u at time t is expressed by the following Expression 7.

$l^u_t$ (or $l_{u,t}$)      [Expression 7]

The position state estimation unit 35 estimates a "position state" of the observation apparatus u based on the estimated position $l_{u,t}$ of the observation apparatus u. In the following description, the position state of the observation apparatus u is expressed by the following Expression 8.

$l'^u_t$ (or $l'_{u,t}$)      [Expression 8]

The position state estimation unit 35 uses the following state equation and observation equation when a position state $l'_{u,t}$ is estimated from the estimated position $l_{u,t}$.

State equation: $l'^s_{t+1} = l'^s_t + n_p$

Observation equation: $l^s_t = l'^s_t + n_m$      [Expression 9]

where $n_p$ and $n_m$ are Gaussian noises around zero.

That is, as described above, the local level model is applied to the position state estimation unit 35 as the state transition model.

As described above, according to the second example embodiment, the local level model is applied as the "state transition model" to both the radio field intensity state estimation unit 32 and the position state estimation unit 35 of the position estimation apparatus 30.

By this configuration of the position estimation apparatus 30, the processing load on the radio field intensity state estimation unit 32 and the position state estimation unit 35 can be reduced, whereby it is possible to perform position estimation at a high speed.

Third Example Embodiment

A third example embodiment relates to a parameter setting of the local level model. Note that the basic configurations of a position estimation system and an observation apparatus according to the third example embodiment are the same as those of the position estimation system 1 and the observation apparatuses 10 and 20 according to the first example embodiment, and thus will be described with reference to FIGS. 1 to 3. That is, the position estimation system according to the third example embodiment includes a position estimation apparatus 40, which will be described later, in place of the position estimation apparatus 30.

Figure 8:
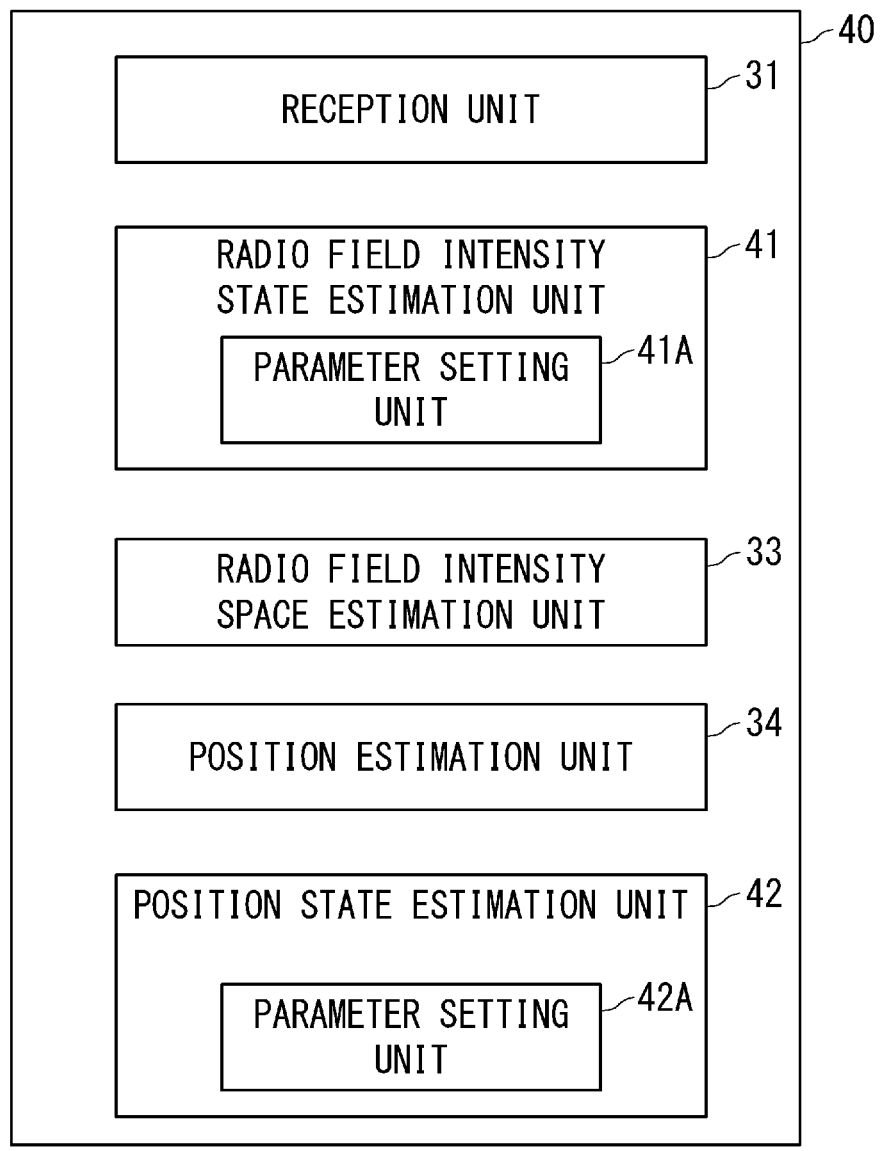
FIG. 8 is a diagram showing an example of a position estimation apparatus according to a third example embodiment.

FIG. 8 is a diagram showing an example of the position estimation apparatus according to the third example embodiment. In FIG. 8, the position estimation apparatus 40 includes the reception unit (the acquisition unit) 31, the radio field intensity space estimation unit 33, the position estimation unit 34, a radio field intensity state estimation unit 41, and a position state estimation unit 42.

The radio field intensity state estimation unit 41 basically performs processing similar to the processing performed by the radio field intensity state estimation unit 32 described in the first and the second example embodiments. Further, the radio field intensity state estimation unit 41 includes a parameter setting unit 41A. The parameter setting unit 41A calculates a "variance value (hereinafter it may be referred to as a "first variance value")" from each of the aforementioned "first time-series data pieces" and sets a variance value of noise in the local level model based on the calculated first variance value. Specifically, the parameter setting unit 41A sets a variance value of noise in the local level model to a value larger than the first variance value. For example, the parameter setting unit 41A may calculate a variance value of noise in the local level model by multiplying the calculated first variance value by a "first coefficient".

For example, when the state $x'_{s,t}$ of the radio field intensity is estimated from the radio field intensity $x_{s,t}$, the parameter setting unit 41A calculates a covariance vector of each of the elements by using the radio field intensities $x_{s,t-99}$ to $x_{s,t}$. In the following description, a covariance vector calculated here is expressed by the following Expression 10.

$$v_t^s (\text{or } v_{s,t}) \hspace{2cm} \text{[Expression 10]}$$

Then, the parameter setting unit 41A sets a value larger than each of the elements of $v_{s,t}$ as a parameter of the variance value of noise in the local level model.

For example, the parameter setting unit 41A uses a value falling within the range of 10,000 to 100,000,000 as the aforementioned "first coefficient". That is, the parameter setting unit 41A may set the following Expression 11 as a parameter of the variance value of noise in the local level model.

$$v_t^s * 20,000 \hspace{2cm} \text{[Expression 11]}$$

The position state estimation unit 42 basically performs processing similar to the processing performed by the position state estimation unit 35 described in the first and the second example embodiments. Further, the position state estimation unit 42 includes a parameter setting unit 42A. The parameter setting unit 42A calculates a "variance value (hereinafter it may be referred to as a "second variance value")" from the aforementioned third time-series data and sets a variance value of noise in the local level model based on the calculated second variance value. Specifically, the parameter setting unit 42A sets a variance value of noise in the local level model to a value larger than the second variance value. For example, the parameter setting unit 42A may calculate a variance value of noise in the local level model by multiplying the calculated second variance value by a "second coefficient".

For example, when the estimated position $l'_{u,t}$ is estimated from the estimated position $l_{u,t}$, the parameter setting unit 42A calculates a covariance vector of each of the elements by using the estimated positions $l_{u,t-99}$ to $l_{u,t}$. In the following description, a covariance vector calculated here is expressed by the following Expression 12.

$$c_t^s (\text{or } c_{s,t}) \hspace{2cm} \text{[Expression 12]}$$

Then, the parameter setting unit 42A sets a value larger than each of the elements of $c_{s,t}$ as a parameter of the variance value of noise in the local level model.

For example, the parameter setting unit 42A uses a value within the range of 10,000 to 100,000,000 as the aforementioned "second coefficient". That is, the parameter setting unit 42A may set the following Expression 13 as a parameter of the variance value of noise in the local level model.

$$c_t^s * 20,000 \hspace{2cm} \text{[Expression 13]}$$

As described above, according to the third example embodiment, the parameter setting unit 41A of the position estimation apparatus 40 calculates the "first variance value" from each of the aforementioned "first time-series data pieces", and sets a variance value of noise in the local level model to a value larger than the first variance value. Further, the parameter setting unit 42A calculates the "second variance value" from the aforementioned third time-series data and sets a variance value of noise in the local level model to a value larger than the second variance value.

By the configuration of the position estimation apparatus 40, the effect of noise included in the observation value can be further reduced, since the two-step state estimation assumes a larger observation noise. Thus, it is possible to perform a more stable position estimation with high accuracy.

Further, the parameter setting unit 41A of the position estimation apparatus 40 calculates a variance value of noise in the local level model by multiplying the calculated first variance value by the first coefficient. Further, the parameter setting unit 42A may calculate a variance value of noise in the local level model by multiplying the calculated second variance value by the second coefficient. Each of the first and the second coefficients has a value falling within the range of 10,000 to 100,000,000.

By the configuration of the position estimation apparatus 40, it is possible to follow the changes in the state itself over time while reducing the effect of noise included in the observation value, since the two-step state estimation assumes an observation noise of a more appropriate magnitude. Thus, it is possible to perform a more stable position estimation with high accuracy.

Other Example Embodiments

<1> By visualizing in real time a state of radio communication which is complicated and changes every moment especially in a factory, a commercial facility, an event hall, a stadium, and the like, the position estimation system 1 described in the first to third example embodiments can be used to understand the cause of the disconnection of the radio communication or the difficulty of the connection in the aforementioned areas, and improve it.

Figure 9:
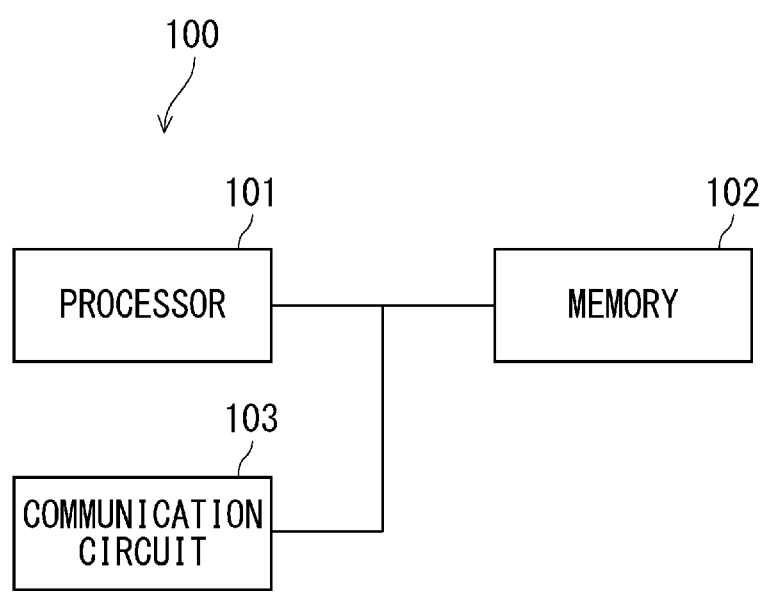
FIG. 9 is a diagram showing an example of a hardware configuration of the position estimation apparatus.

<2> FIG. 9 is a diagram showing an example of a hardware configuration of the position estimation apparatus. In FIG. 9, a position estimation apparatus 100 includes a processor 101, a memory 102, and a communication circuit 103. The processor 101 may be, for example, a microprocessor, a Micro Processor Unit (MPU), or a Central Processing Unit (CPU). The processor 101 may include a plurality of processors. The memory 102 is composed of, for example, a combination of a volatile memory and a non-volatile memory. The memory 102 may include a storage located remotely from the processor 101. In this case, the processor 101 may access the memory 102 via an I/O interface (not shown).

Each of the position estimation apparatuses 30 and 40 according to the first to the third example embodiments can have the hardware configuration shown in FIG. 9. The radio field intensity state estimation units 32 and 41, the radio field intensity space estimation unit 33, the position estimation unit 34, and the position state estimation units 35 and 42 of the position estimation apparatuses 30 and 40 according to the first to the third example embodiments may be implemented by the processor 101 loading and executing a program stored in the memory 102. The reception unit (the acquisition unit) 31 may be implemented by the communication circuit 103. The program can be stored using any type of non-transitory computer readable media and provided to the position estimation apparatuses 30 and 40. Examples of the non-transitory computer readable media include a magnetic recording medium (such as a flexible disk, a magnetic tape, and a hard disk drive) and a magneto-optic recording medium (such as a magneto-optic disk). Further, examples of the non-transitory computer readable media include CD-ROM (Read Only Memory), CD-R, and CD-R/W. Further, examples of the non-transitory computer readable media include a semiconductor memory. The semiconductor memory includes, for example, a mask ROM, a Programmable ROM (PROM), an Erasable PROM (EPROM), a flash ROM, and a Random Access Memory (RAM). Further, the program may be supplied to the position estimation apparatuses 30 and 40 by using various types of transitory computer readable media. Examples of the transitory computer readable media include an electrical signal, an optical signal, and an electromagnetic wave. Transitory computer readable media can provide the program to the position estimation apparatuses 30 and 40 through a wired communication line (e.g., electric wires and optical fibers) or a wireless communication line.

The first to the third example embodiments can be combined as desirable by one of ordinary skill in the art.

While the disclosure has been particularly shown and described with reference to embodiments thereof, the disclosure is not limited to these embodiments. It will be understood by those of ordinary skill in the art that various changes in form and details may be made therein without departing from the spirit and scope of the present disclosure as defined by the claims.

According to the present disclosure, it is possible to provide a position estimation apparatus, a position estimation method, a program, and a position estimation system that are capable of improving the accuracy of position estimation.

What is claimed is:

1. A position estimation apparatus comprising:
   hardware, including a processor and a memory;
   an acquisition unit that is implemented at least by the hardware and configured to acquire, from each of a plurality of first observation apparatuses of which positions are known, first time-series data of a radio field intensity of a predetermined signal received by each of the plurality of the first observation apparatuses and acquire, from a second observation apparatus of which a position is not known, second time-series data of a radio field intensity of a predetermined signal received by the second observation apparatus;
   a radio field intensity state estimation unit that is implemented at least by the hardware and configured to estimate, from each of the acquired first time-series data pieces, a state of a radio field intensity at a position of the first observation apparatus that corresponds to each of the first time-series data pieces, and estimate, from the acquired second time-series data, a state of a radio field intensity at a position of the second observation apparatus;
   a radio field intensity space estimation unit that is implemented at least by the hardware and configured to estimate a state of a radio field intensity at each of points in a target space by using the position and the estimated state of the radio field intensity of each of the plurality of the first observation apparatuses;
   a position estimation unit that is implemented at least by the hardware and configured to compare the estimated state of the radio field intensity at each of the points with the estimated state of the radio field intensity at the position of the second observation apparatus and thereby estimate the position of the second observation apparatus; and
   a position state estimation unit that is implemented at least by the hardware and configured to estimate a position state of the second observation apparatus based on third time-series data of the estimated position of the second observation apparatus.

2. The position estimation apparatus according to claim 1, wherein a local level model is applied as a state transition model to the radio field intensity state estimation unit.

3. The position estimation apparatus according to claim 2, wherein the radio field intensity state estimation unit comprises a first parameter setting unit configured to calculate a first variance value from each of the first time-series data pieces and sets a variance value of noise in the local level model based on the calculated first variance value.

4. The position estimation apparatus according to claim 3, wherein the first parameter setting unit calculates the variance value of the noise by multiplying the calculated first variance value by a first coefficient, and the first coefficient has a value falling within a range of 10,000 to 100,000,000.

5. The position estimation apparatus according to claim 1, wherein a local level model is applied as a state transition model to the position state estimation unit.

6. The position estimation apparatus according to claim 5, wherein the position state estimation unit comprises a second parameter setting unit configured to calculate a second variance value from the third time-series data and sets a variance value of noise in the local level model based on the calculated second variance value.

7. The position estimation apparatus according to claim 6, wherein the second parameter setting unit calculates the variance value of the noise by multiplying the calculated second variance value by a second coefficient, and the second coefficient has a value falling within a range of 10,000 to 100,000,000.

8. A position estimation method comprising:
acquiring, from each of a plurality of first observation apparatuses of which positions are known, first time-series data of a radio field intensity of a predetermined signal received by each of the plurality of the first observation apparatuses and acquiring, from a second observation apparatus of which a position is not known, second time-series data of a radio field intensity of a predetermined signal received by the second observation apparatus;
estimating, from each of the acquired first time-series data pieces, a state of a radio field intensity at a position of the first observation apparatus that corresponds to each of the first time-series data pieces, and estimating, from the acquired second time-series data, a state of a radio field intensity at a position of the second observation apparatus;
estimating a state of a radio field intensity at each of points in a target space by using the position and the estimated state of the radio field intensity of each of the plurality of first observation apparatuses;
comparing the estimated state of the radio field intensity at each of the points with the estimated state of the radio field intensity at the position of the second observation apparatus and thereby estimating the position of the second observation apparatus; and
estimating a position state of the second observation apparatus based on third time-series data of the estimated position of the second observation apparatus.

9. A non-transitory computer-readable medium storing a program for causing a position estimation apparatus to:
acquire, from each of a plurality of first observation apparatuses of which positions are known, first time-series data of a radio field intensity of a predetermined signal received by each of the plurality of the first observation apparatuses and acquire, from a second observation apparatus of which a position is not known, second time-series data of a radio field intensity of a predetermined signal received by the second observation apparatus;
estimate, from each of the acquired first time-series data pieces, a state of a radio field intensity at a position of the first observation apparatus that corresponds to each of the first time-series data pieces, and estimate, from the acquired second time-series data, a state of a radio field intensity at a position of the second observation apparatus;
estimate a state of a radio field intensity at each of points in a target space by using the position and the estimated state of the radio field intensity of each of the plurality of the first observation apparatuses;
compare the estimated state of the radio field intensity at each of the points with the estimated state of the radio field intensity at the position of the second observation apparatus and thereby estimate the position of the second observation apparatus; and
estimate a position state of the second observation apparatus based on third time-series data of the estimated position of the second observation apparatus.

* * * * *